US010276201B1

United States Patent
Srinivasan et al.

(10) Patent No.: US 10,276,201 B1
(45) Date of Patent: Apr. 30, 2019

(54) DUAL PHASE MGO-X SEED LAYERS FOR HEAT ASSISTED MAGNETIC RECORDING MEDIA

(71) Applicant: WD Media, LLC, San Jose, CA (US)

(72) Inventors: Kumar Srinivasan, Redwood City, CA (US); Tomoko Seki, Sunnyvale, CA (US); Rui Zhang, Milpitas, CA (US); Antony Ajan, San Jose, CA (US); Paul C. Dorsey, Los Altos, CA (US)

(73) Assignee: WD MEDIA, LLC, San Jose, CA (US)

( * ) Notice: Subject to any disclaimer, the term of this patent is extended or adjusted under 35 U.S.C. 154(b) by 377 days.

(21) Appl. No.: 15/050,032

(22) Filed: Feb. 22, 2016

Related U.S. Application Data

(60) Provisional application No. 62/249,797, filed on Nov. 2, 2015.

(51) Int. Cl.
  *G11B 5/66* (2006.01)
  *G11B 5/31* (2006.01)
  *G11B 5/73* (2006.01)
  *G11B 5/00* (2006.01)

(52) U.S. Cl.
  CPC .............. *G11B 5/66* (2013.01); *G11B 5/314* (2013.01); *G11B 5/732* (2013.01); *G11B 2005/0021* (2013.01)

(58) Field of Classification Search
  CPC ....... G11B 5/732; G11B 5/7325; G11B 5/738; G11B 5/66; G11B 2005/0021
  See application file for complete search history.

(56) References Cited

U.S. PATENT DOCUMENTS

| 6,620,531 | B1 | 9/2003 | Cheng |
| 8,003,237 | B2 | 8/2011 | Sonobe et al. |
| 8,605,555 | B1 | 12/2013 | Chernyshov et al. |
| 8,623,670 | B1 | 1/2014 | Mosendz et al. |
| 8,889,275 | B1 * | 11/2014 | Yuan ..................... G11B 5/653 428/829 |
| 8,941,950 | B2 | 1/2015 | Yuan et al. |
| 8,956,741 | B1 | 2/2015 | Li |
| 8,993,134 | B2 | 3/2015 | Varaprasad et al. |
| 9,076,476 | B2 | 7/2015 | Kryder et al. |
| 2012/0214021 | A1 | 8/2012 | Sayama et al. |
| 2012/0307398 | A1 * | 12/2012 | Kanbe ...................... G11B 5/65 360/75 |
| 2013/0209835 | A1 * | 8/2013 | Qui ....................... B32B 15/018 428/829 |

(Continued)

OTHER PUBLICATIONS

Hoan Cong Ho, et al., U.S. Appl. No. 14/954,397, filed Nov. 30, 2015, 21 pages.

(Continued)

*Primary Examiner* — Holly C Rickman
(74) *Attorney, Agent, or Firm* — Loza & Loza, LLP; Gabriel Fitch

(57) ABSTRACT

Magnetic media having dual phase MgO-X seed layers with both MgO grains and segregants are provided. One such magnetic medium includes a substrate, a heatsink layer on the substrate, a dual phase seed layer on the heatsink layer, where the dual phase seed layer comprises MgO and a segregant, where a concentration of the MgO is greater than 50 percent by volume in the dual phase seed layer, and a magnetic recording layer including FePt on the dual phase seed layer.

26 Claims, 4 Drawing Sheets

(56) References Cited

U.S. PATENT DOCUMENTS

2014/0030552 A1*  1/2014  Inaba .................... G11B 5/66
                                                      428/828
2014/0093748 A1   4/2014  Chen et al.
2015/0093598 A1   4/2015  Kubota et al.

OTHER PUBLICATIONS

Antony Ajan, et al., U.S. Appl. No. 13/436,596, filed Mar. 30, 2012, 13 pages.
Kyongha Kang, et al., U.S. Appl. No. 14/586,727, filed Dec. 30, 2014, 28 pages.
Zhenguo Wang, et al., U.S. Appl. No. 14/695,463, filed Apr. 24, 2015, 25 pages.
Kumar Srinivasan et al., U.S. Appl. No. 14/497,299, filed Sep. 25, 2014, 29 pages.
Rui Zhang, et al., U.S. Appl. No. 14/935,337, filed Nov. 6, 2015, 24 pages.

* cited by examiner

DUAL PHASE MGO-X SEED LAYERS FOR HEAT ASSISTED MAGNETIC RECORDING MEDIA

CROSS-REFERENCE TO RELATED APPLICATION(S)

This application claims priority to and the benefit of U.S. Provisional Application No. 62/249,797, filed on Nov. 2, 2015 and entitled, "DUAL PHASE MGO-X SEED LAYERS FOR HEAT ASSISTED MAGNETIC RECORDING MEDIA", the entire content of which is incorporated herein by reference.

BACKGROUND

In heat assisted magnetic recording (HAMR) technology, the FePt based recording medium is heated to above its Curie temperature (Tc) using a laser. The laser generated heat may be guided to the medium using a near-field transducer (NFT) placed near the inductive write head. As the medium cools, writing is then carried out during the refreezing process. Because the bit transitions are determined by the thermal gradients, as opposed to just the write field gradients, much higher linear/track densities can be achievable with HAMR as opposed to previous magnetic recording technologies.

The FePt magnetic recording layer may be grown on an MgO seed layer. However, such designs may lead to in-plane variants, misaligned grains in the FePt magnetic recording layer, and overall poor recording performance by the medium.

DETAILED DESCRIPTION

Figure 1:
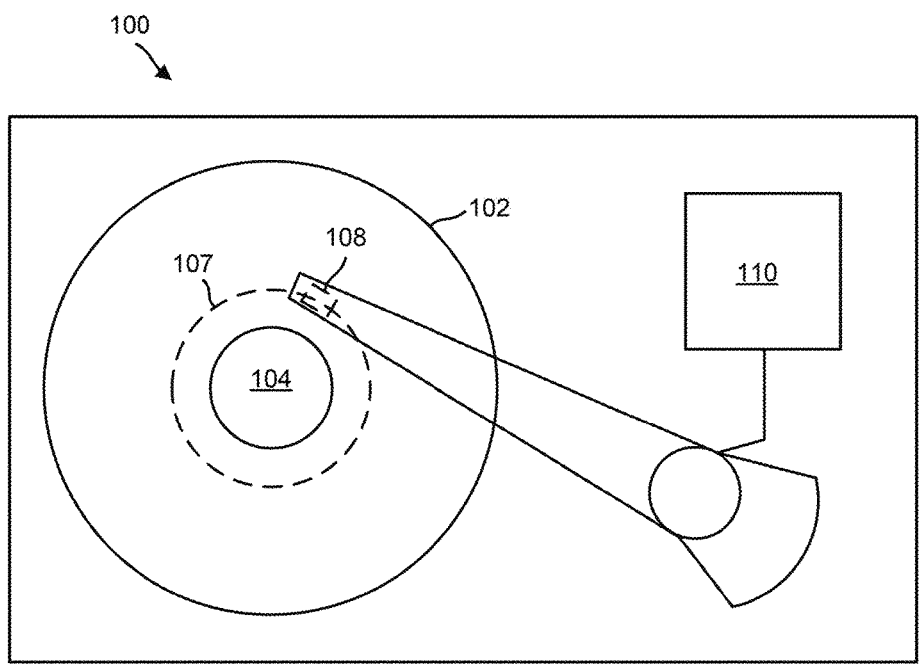
FIG. 1 is a top schematic view of a disk drive configured for heat assisted magnetic recording (HAMR) including a magnetic medium with a dual phase MgO-X seed layer including both MgO grains and segregants in accordance with one embodiment of the disclosure.

In a related art recording system, an $L1_0$ phase FePt magnetic recording layer may be grown on a MgO crystalline seed layer. Segregant materials with low surface energy such as C, SiO2, BN may be present in the FePt layer to magnetically and thermally isolate the grains. A high thermal conductivity material such as Ru can be used as a heat sink layer under the FePt and MgO layers. The heat sink layer is used because after heating the FePt grains to above the Curie temperature (Tc) the heat generally needs to be quickly dissipated from the recording layer. Otherwise the heat can spread laterally and cause neighboring grains to inadvertently heat up. In order to grow an MgO layer with the proper texture (e.g., fcc (002)), an amorphous underlayer (AUL) may be necessary on top of the heat sink layer.

In the related art system, the crystallographic lattice matching between $L1_0$ phase FePt and fcc-phase MgO makes epitaxial growth of the former possible on the latter. However, the MgO (001) plane has much lower surface energies (about 1.2 Joules per meter squared or $J/m^2$) as compared to that of the FePt (002) plane (about 2.9 $J/m^2$). Due to this surface energy mismatch, there is no one-to-one grain growth of the FePt on the MgO layer. Moreover, grain sizes in the MgO layer tend to be large in size and wide in distribution (typically in the range of about 10-30 nanometers or nm). Due to these reasons, the FePt grain morphology in the related art system may be irregular in shape and non-uniform in size.

Referring now to the drawings, embodiments of magnetic media having dual phase MgO-X seed layers with both MgO grains and segregants are illustrated. The magnetic media may include a substrate, a heatsink layer on the substrate, a dual phase seed layer on the heatsink layer, where the dual phase seed layer comprises MgO and a segregant, where a concentration of the MgO is greater than 50 percent by volume in the dual phase seed layer, and a magnetic recording layer including FePt on the dual phase seed layer.

By careful addition of specific materials (e.g., segregants) to the MgO layer, it is possible to produce a dual phase microstructure including small, uniformly sized MgO grains that are separated by a grain boundary phase of segregant material. The FePt layer grown on this dual phase MgO layer can follow a one to one grain growth pattern, thereby resulting in more regularly shaped and uniformly sized grains.

FIG. 1 is a top schematic view of a disk drive 100 configured for heat assisted magnetic recording (HAMR) including a magnetic medium 102 with a dual phase MgO-X seed layer including both MgO grains and segregants in accordance with one embodiment of the disclosure. The laser (not visible in FIG. 1 but see 114 in FIG. 2) is positioned with a head/slider 108. Disk drive 100 may include one or more disks/media 102 to store data. Disk/media 102 resides on a spindle assembly 104 that is mounted to drive housing 106. Data may be stored along tracks in the magnetic recording layer of disk 102. The reading and writing of data is accomplished with the head 108 that may have both read and write elements. The write element is used to alter the properties of the magnetic recording layer of disk 102 and thereby write information thereto. In one embodiment, head 104 may have magneto-resistive (MR), or giant magneto-resistive (GMR) elements. In an alternative embodiment, head 104 may be another type of head, for example, an inductive read/write head or a Hall effect head.

In operation, a spindle motor (not shown) rotates the spindle assembly 104, and thereby rotates disk 102 to position head 108 at a particular location along a desired disk track 107. The position of head 104 relative to disk 102 may be controlled by position control circuitry 110.

Figure 2:
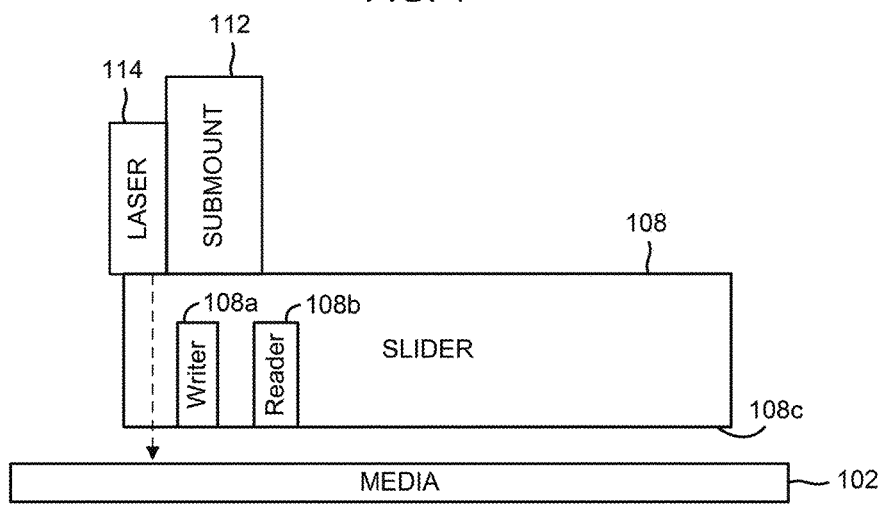
FIG. 2 is a side schematic view of the slider and HAMR magnetic medium of FIG. 1 with the dual phase MgO-X seed layer including both MgO grains and segregants in accordance with one embodiment of the disclosure.

FIG. 2 is a side schematic view of the slider 108 and HAMR magnetic medium 102 of FIG. 1 with the dual phase MgO-X seed layer including both MgO grains and segregants in accordance with one embodiment of the disclosure. The HAMR system components also include a sub-mount attached 112 to a top surface of the slider 108. The laser 114 is attached to the sub-mount 112, and possibly to the slider 108. The slider 108 includes the write element (e.g., writer) 108a and the read element (e.g., reader) 108b positioned along an air bearing surface (ABS) 108c of the slider for writing information to, and reading information from, respectively, the media 102.

In operation, the laser 114 is configured to generate and direct light energy to a waveguide (possibly along the dashed line) in the slider which directs the light to a near field transducer (NFT) near the air bearing surface (e.g., bottom surface) 108c of the slider 108. Upon receiving the light from the laser 114 via the waveguide, the NFT generates localized heat energy that heats a portion of the media 102 near the write element 108a and the read element 108b. FIGS. 1 and 2 illustrate a specific embodiment of a HAMR system. In other embodiments, the HAMR magnetic medium 102 with the magnetic recording layer having the dual phase MgO-X seed layer with both MgO grains and segregants can be used in other suitable HAMR systems.

One way to improve the microstructure of an FePt magnetic recording layer in a magnetic medium is to improve the microstructure of the MgO layer so that it can serve as a template. By alloying the MgO layer with a specific set of materials, it is possible to produce a two-phase (e.g., dual phase) microstructure including small, uniformly sized MgO grains that are separated by a matrix phase of segregant material.

Figure 3:
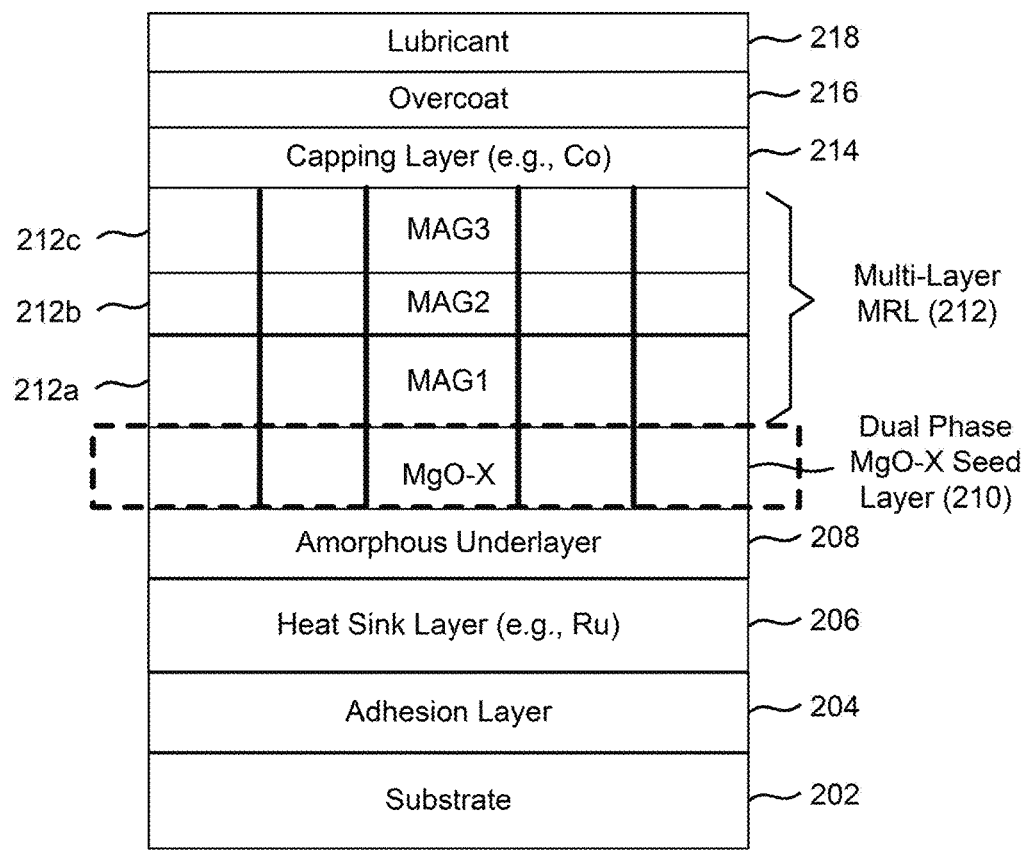
FIG. 3 is a side schematic view of a HAMR magnetic medium with a dual phase MgO-X seed layer including both MgO grains and segregants below a multi-layer magnetic recording layer (MRL) in accordance with one embodiment of the disclosure.

FIG. 3 is a side schematic view of a HAMR magnetic medium 200 with a dual phase MgO-X seed layer 210 including both MgO grains and segregants below a multi-layer magnetic recording layer (MRL) 212 in accordance with one embodiment of the disclosure. In sequence from the bottom, the medium 200 includes a substrate 202, an adhesion layer 204, a heat-sink layer (e.g., made of Ru) 206, an amorphous underlayer (AUL) 208, the dual phase MgO-X seed layer 210, the multi-layer magnetic recording layer (MRL) 212, a cap or capping magnetic layer (e.g., made of Co) 214, an overcoat layer 216, and a lubricant layer 218.

The multi-layer magnetic recording layer (MRL) 212 includes three FePt based magnetic recording layers with dopants and segregants, including MAG1 212a, MAG2 212b and MAG3 212c. In some embodiments, a thermal barrier layer or TBL based on oxide materials such as ZrO2 is inserted between the heat sink layer 206 and the AUL 208. The dual phase MgO layer 210 is a layer of interest in this disclosure and is highlighted by a dashed rectangle.

This HAMR magnetic medium 200 with the dual phase MgO-X seed layer 210 is one example of a proposed improvement to the single phase MgO seed layer design. More specifically, the single phase MgO layer is replaced with a dual phase MgO-X layer where the material X is a segregant and satisfies, or substantially satisfies, one or more of following properties: (i) it is chemically non-reactive with MgO, (ii) it is immiscible to a large extent with MgO so that it can segregate, and (iii) it has very low surface energies so that it forms a matrix/grain boundary phase in which the MgO grains are embedded. When the FePt and segregant layer is grown on top of this dual phase MgO layer, the low surface energy constituents in each layer (e.g., the segregants defining the grain boundaries) will tend to line up.

Additionally, the MgO grains size and shape (e.g., uniform or substantially uniform) can provide a template for the FePt grains to grow on. These two aspects can lead to one to one grain growth (e.g., between the MgO seed layer and the FePt magnetic recording layer) resulting in more regularly shaped and uniformly sized grains in the FePt magnetic recording layer.

The sputter process conditions for the dual phase MgO-X seed layer 210 may include radio frequency (RF) sputtering with low sputter pressure of less than about 5 millitorr, or other suitable conditions. In other embodiments, the sputter process conditions can involve use of direct current (DC) sputtering. In one such example, the seed layer is deposited using DC sputtering and includes MgO-X where X is carbon at about 35 mole percent. In another embodiment, the sputter process conditions can involve use of pulsed DC sputtering.

Examples of materials that may satisfy one or more of the three properties listed above for the material X in the dual phase MgO-X layer can include (i) elements such as Al, Ba, C, Ca, Cs, Li, Sr, Y, Yb; (ii) oxides such as Al2O3, La2O3, SiO2, Ta2O3, TiO2, V2O3, WO3, ZrO2 and others; (iii) carbides such as AlC, BC, SiC, TaC, TiC, WC and others; and (iv) nitrides such as AlN, BN, SiN, TaN, TiN, ZrN and others.

In some more specific embodiments, the X materials of the dual phase MgO-X layer 210 can be made of one or more materials such as an C, ZrO2, BN, AlN, and/or combinations thereof. In one such embodiment, the X material is C in a range of about 1 percent to less than 50 percent by volume. In another embodiment, the X material is C in a range of about 5 percent to less than 15 percent by volume. In another embodiment, the X material is C at about 10 percent by volume. In another embodiment, the X material is ZrO2 in a range of less than 5 percent by volume. In several embodiments, the concentration of MgO in the MgO-X layer is greater than 50 percent by volume. In one embodiment, the term "about" as used herein can refer to a range of 10 percent.

In several embodiments, the MgO of the dual phase MgO-X layer 210 is crystalline (e.g., rock salt with crystal texture of 002) rather than amorphous. In some embodiments, the segregants (e.g., X materials) are amorphous. In other embodiments, the segregants can be crystalline, though generally with a different crystal structure than that of the crystalline MgO (e.g., crystal phase of the MgO is different from a crystal phase of the segregant).

In one aspect, the dual phase MgO-X seed layer can be defined as a layer having two phases. That is, one phase can be crystalline MgO and the other phase can be amorphous X material(s) (e.g., amorphous material or an amorphous alloy) or crystalline X material(s), where the crystal X material has a different crystal shape than that of the crystal MgO. In some embodiments, the dual phase MgO-X seed layer can be defined as a layer having at least two phases (e.g., multiple phases). In such case, the dual phase MgO-X seed layer may include multiple segregants each having the same or different phases.

In one embodiment, the dual phase MgO-X seed layer 210 can be formed as a dual layer structure. In one such case, the lower/base layer (e.g., pre-seed layer) can include MgO (with a preselected texture) and the upper layer (e.g., immediately below the recording layer) can be a dual phase MgO-X layer. The lower/base layer (e.g., pre-seed layer) can be positioned on the heatsink layer 206 or on the amorphous underlayer 208. In one aspect, the dual layer structure can provide more control in that the lower MgO layer can be used to set a preselected texture while the upper MgO-X layer can be used to control grain size.

In one embodiment, the substrate 202 can be made of one or more materials such as an Al alloy, NiP plated Al, glass, glass ceramic, and/or combinations thereof. In one embodiment, the substrate 202 is a glass substrate having a diameter of about 97 millimeters or less. In other embodiments, the diameter may vary. In one embodiment, the adhesion layer 204 can include one or more materials such as CrTi, CrTa, NiTa, combinations thereof, and/or other suitable materials known in the art.

In one embodiment, the heat sink layer 206 can be made of one or more materials such as W, Mo, Ru, Cr, Cr, combinations thereof, and/or other suitable materials known in the art. In one embodiment, the thermal barrier layer can be made of one or more materials such as ZrO2, SiO2, HfO2, Mg2SiO4, combinations thereof, and/or other suitable materials known in the art. In one embodiment, the amorphous underlayer (AUL) 208 can be made of one or more materials such as CoZrWMo, a CrTa/RuAl stack, Cr, combinations thereof, and/or other suitable materials known in the art.

In one embodiment, the MAG1 magnetic recording layer 212a can be made of one or more materials such as FePt—AgC, FePtAgCuC, combinations thereof, and/or other suitable materials known in the art. In one embodiment, the MAG2 magnetic recording layer 212b can be made of one or more materials such as FePt—BNC, FePt—CuBNC, FePt—AgBNC, combinations thereof, and/or other suitable materials known in the art. In one embodiment, the MAG3 magnetic recording layer 212c can be made of one or more materials such as FePt—BNSiO2, FePt—CuBNSiO2, combinations thereof, and/or other suitable materials known in the art. In some embodiments, the multi-layer magnetic recording layer 212 can be replaced with a single layer magnetic recording layer including $L1_0$ phase FePt, which may be the majority alloy of the layer. In one embodiment, the multi-layer magnetic recording layer 212 includes a first magnetic recording layer (e.g., MAG1 212a) including FePtX, where X is a material such as Cu, Ni, or a combinations thereof, a second magnetic recording layer (e.g., MAG2 212b) on the first magnetic recording layer 212a and having at least one material different from the materials of the first magnetic recording layer 212a, and a third magnetic recording layer (e.g., MAG3 212c) on the second magnetic recording layer 212b and having at least one material different from the materials of the first magnetic recording layer 212a. In one embodiment, each of MAG1, MAG2, and MAG3 include $L1_0$ phase FePt.

In one embodiment, the capping layer 214 can be made of one or more materials such as Co, Pt, Pd, CoFe, CoFeB, CoPt, combinations thereof, and/or other suitable materials known in the art. In one embodiment, the overcoat layer 216 is made of one or more materials such as C and/or other suitable materials known in the art. In one embodiment, the lubricant layer 218 is made of one or more materials such as a polymer based lubricant and/or other suitable materials known in the art.

In some embodiments, the magnetic medium 200 may not include all of the layers depicted in FIG. 3. For example, in one such embodiment, the magnetic medium 200 may not include the adhesion layer 204, the amorphous under layer 208, the capping layer 214, the overcoat layer 216, or the lubricant layer 218. In one embodiment, the multi-layer magnetic recording layer 212 may be replaced with a single layer magnetic recording layer.

Figure 4B:
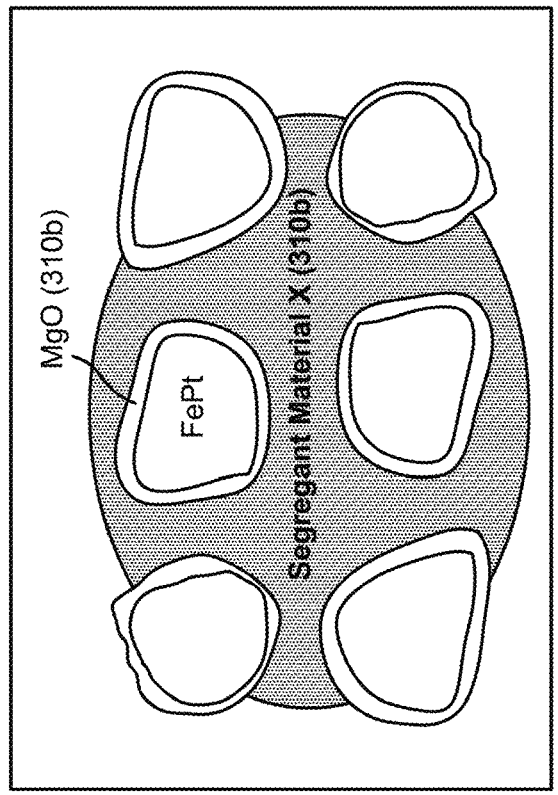
FIG. 4b is a top schematic view of the dual phase MgO-X seed layer and a portion of the FePt magnetic recording layer of FIG. 4a illustrating the how the FePt grains grow on the dual phase MgO seed layer in accordance with one embodiment of the disclosure.
Figure 4A:
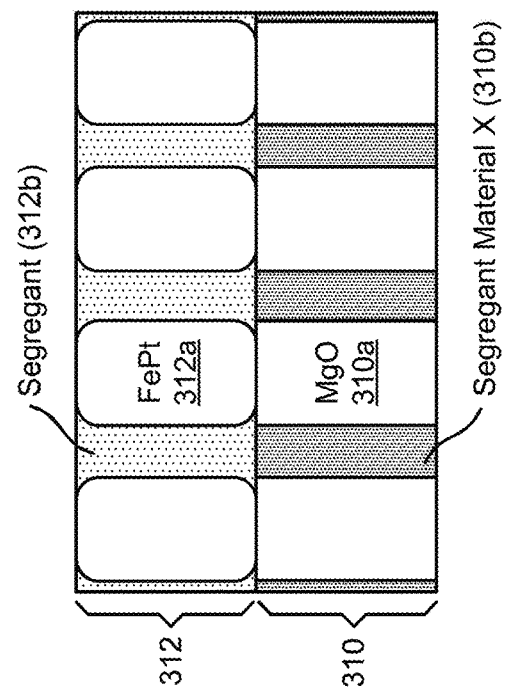
FIG. 4a is an expanded side schematic view of a dual phase MgO-X seed layer, including both MgO grains and segregants, and a FePt magnetic recording layer illustrating the how the FePt grains grow on the dual phase MgO-X seed layer in accordance with one embodiment of the disclosure.

FIG. 4a is an expanded side schematic view of a dual phase MgO-X seed layer 310, including both MgO grains 310a and segregants 310b, and a FePt magnetic recording layer 312 illustrating the how the FePt grains 312a grow on the dual phase MgO-X seed layer in accordance with one embodiment of the disclosure.

FIG. 4b is a top schematic view of the dual phase MgO-X seed layer and a portion of the FePt magnetic recording layer of FIG. 4a illustrating the how the FePt grains grow on the dual phase MgO seed layer in accordance with one embodiment of the disclosure.

Referring now to FIGS. 4a and 4b, the segregant material X (310b) being immiscible (or substantially immiscible) with MgO, segregates to the grain boundaries of the dual phase MgO-X seed layer 310. The segregant(s) 310b essentially forms a matrix phase in which the MgO grains 312a are embedded. If the material X also has lower surface energies than MgO, then it can wet the MgO grains very well, so that the MgO can form columnar structures. As shown in FIGS. 4a and 4b, the FePt layer formed on top of this MgO-X layer has a one on one grain morphology (e.g., grains of upper layer, such as 312a, are substantially on top of grains of lower layer, 310a). While not bound by any particular theory, this is likely because the segregant materials 312b used in the FePt layer (e.g., C, SiO2, BN, and the like) 312 have very low surface energies and will thus prefer to form over the low surface energy segregant material 310b in the MgO layer 310. For similar reasons, the higher surface energy FePt grains 312a will prefer to grow over the higher surface energy MgO grains 310a, as is shown in FIGS. 4a and 4b.

With this micro structural framework, the grain size in the MgO layer can be engineered by controlling the amount of segregant material in it. Due to subsequent one-on-one growth, the dual phase MgO-X layer can now serve as a template for grain size control in the FePt layer. In addition, because the FePt grains can preferentially be formed only over the MgO grain core, fewer in-plane variants will be produced.

In contrast to the dual phase MgO-X layer of FIGS. 4a and 4b, a single phase MgO design exhibits different and less desirable characteristics. For example, due to the rather low surface energy of MgO grains (about 1.2 $J/m^2$), the single phase MgO layer exhibits large, non-uniform grains. However, the surface energy of the FePt is much larger (about 2.9 $J/m^2$), and due to the surface energy mismatch, the FePt grains form 'island-like' structures with large wetting angles. In this scenario, there is no one-on-one growth and the FePt grains may be formed either over a grain core or over a grain boundary in the MgO layer. For these reasons, the FePt grains are irregular in shape, non-uniform in size and also exhibit a large fraction of in-plane or misaligned grains.

There are a number of advantages that can be garnered from the dual-phase MgO-X seed layers described herein. For example, advantages include improved thermal gradients leading to better signal to noise ratios (SNR and due to anisotropic thermal properties in the MgO layer), improved efficiency in laser delivery leading to better head lifetimes (e.g., from tunability of optical properties via the segregant X), and improved corrosion resistance leading to better manufacturability (e.g., segregant protects against anodic corrosion).

The dual-phase MgO-X seed layer can also provide a number of possible benefits. For example, the dual-phase MgO-X seed layer can improve MgO grain size and distribution, and create one-to-one FePt on MgO grain growth for improved FePt grain size and distribution. The dual-phase MgO-X seed layer can also reduce in-plane variants and misaligned grains in the FePt recording layer, and produce anisotropic thermal properties in MgO leading to improved thermal gradients. The dual-phase MgO-X seed layer can also increase magnetic head lifetimes by improving efficiency in laser delivery, and reduce MgO corrosion for manufacturability readiness.

Figure 5:
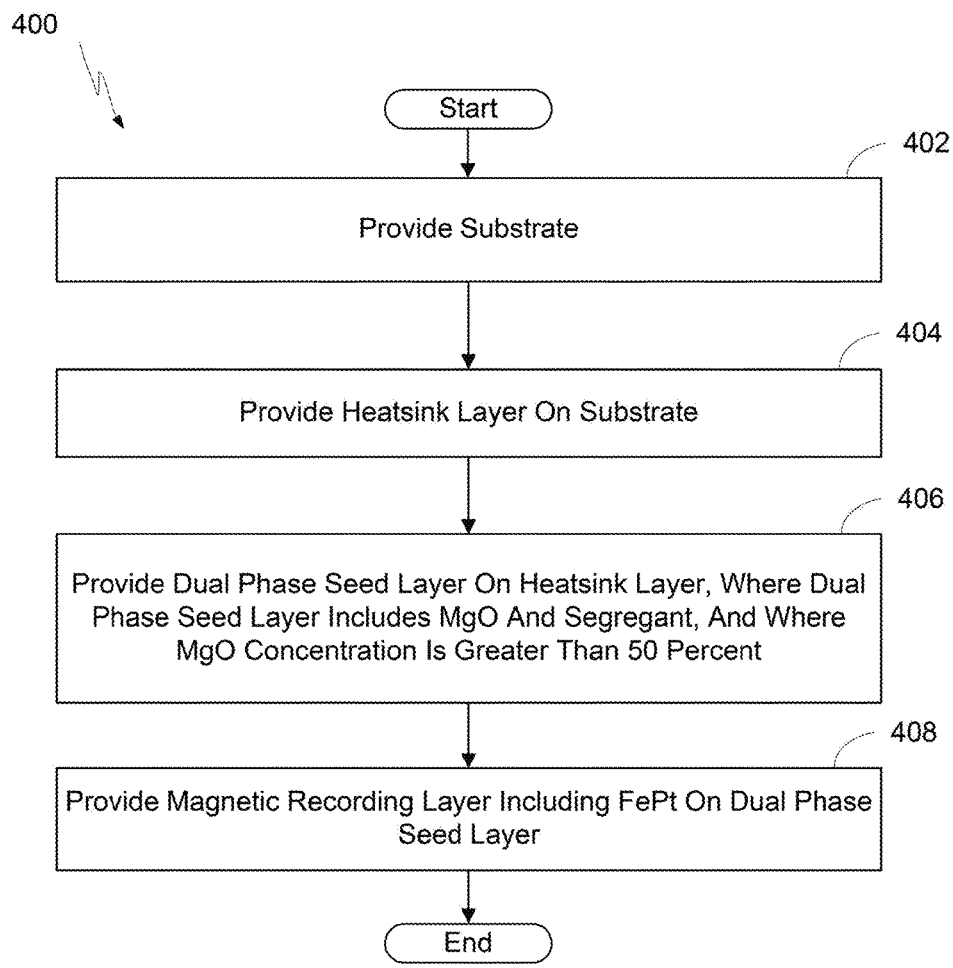
FIG. 5 is a flowchart of a process for manufacturing a HAMR magnetic medium with a dual phase MgO-X seed layer including both MgO grains and segregants below a magnetic recording layer (MRL) in accordance with one embodiment of the disclosure.

FIG. 5 is a flowchart of a process 500 for manufacturing a HAMR magnetic medium with a dual phase MgO-X seed layer with both MgO grains and segregants below a multi-layer magnetic recording layer (MRL) in accordance with one embodiment of the disclosure. In particular embodiments, the process can be used to fabricate/manufacture any of the magnetic media with dual phase MgO-X seed layers described herein, including the media illustrated in FIG. 3, and FIGS. 4a and 4b.

In block 402, the process can provide a substrate. In block 404, the process provides a heatsink layer on the substrate. In block 406, the process provides a dual phase seed layer on the heatsink layer, where the dual phase seed layer includes MgO and a segregant, and where a concentration of the MgO is greater than 50 percent by volume in the dual phase seed layer. In block 408, the process provides a magnetic recording layer including FePt on the dual phase seed layer.

In several embodiments, the process may include providing additional layers such as the additional layers shown in FIG. 3.

In one embodiment, the process further includes selecting a characteristic to form a preselected grain size for grains of the MgO, where the characteristic is selected from a material of the segregant, a quantity of the segregant, and combinations thereof. In another embodiment, the process controls a grain size of grains of the FePt in the magnetic recording layer by selecting the characteristic.

In one embodiment, the process can perform the sequence of actions in a different order. In another embodiment, the process can skip one or more of the actions. In other embodiments, one or more of the actions are performed simultaneously. In some embodiments, additional actions can be performed.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

In several embodiments, the deposition of layers, such as those found in the magnetic media, described herein can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

In one embodiment, the drawings may be considered as having been drawn to scale. In another embodiment, the drawings may be considered as having not been drawn to scale. Unless specifically designated as being prior art, no part of this specification may be considered an admission of prior art.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A magnetic recording medium for heat assisted magnetic recording, the medium comprising:
   a substrate;
   a heatsink layer on the substrate;
   a dual phase seed layer on the heatsink layer, wherein the dual phase seed layer comprises MgO and a segregant, wherein a concentration of the MgO is greater than or equal to 95 percent by volume in the dual phase seed layer;
   a pre-seed layer comprising MgO, wherein the dual phase seed layer is directly on the pre-seed layer and the pre-seed layer is on the heatsink layer; and
   a magnetic recording layer comprising FePt on the dual phase seed layer.

2. The magnetic recording medium of claim 1, wherein a crystal phase of the MgO is different from a crystal phase of the segregant.

3. The magnetic recording medium of claim 1:
   wherein the dual phase seed layer comprises MgO grains; and
   wherein the magnetic recording layer comprises FePt grains separated by a segregant, wherein the FePt grains have about a one to one correspondence with the MgO grains.

4. The magnetic recording medium of claim 1, wherein the segregant comprises a material selected from the group consisting of C, ZrO2, BN, AN, and combinations thereof.

5. The magnetic recording medium of claim 4, wherein the segregant comprises C in a range of about 1 percent to 50 percent by volume.

6. The magnetic recording medium of claim 4, wherein the segregant comprises ZrO2 in an amount less than about 5 percent by volume.

7. The magnetic recording medium of claim 1, wherein the segregant comprises a material selected from the group consisting of an amorphous material and an amorphous alloy.

8. The magnetic recording medium of claim 1, wherein the segregant comprises a characteristic selected from the group consisting of being chemically non-reactive with MgO, being substantially immiscible with MgO, having a lower surface energy than that of MgO, and combinations thereof.

9. The magnetic recording medium of claim 1, wherein the magnetic recording layer comprises a multi-layer magnetic recording layer comprising:
    a first magnetic recording layer comprising FePtX, where X is a material selected from the group consisting of Cu, Ni, and combinations thereof;
    a second magnetic recording layer on the first magnetic recording layer and having at least one material different from the materials of the first magnetic recording layer; and
    a third magnetic recording layer on the second magnetic recording layer and having at least one material different from the materials of the first magnetic recording layer.

10. The magnetic recording medium of claim 1, wherein the magnetic recording layer further comprising:
    an adhesion layer between the substrate and the heatsink layer;
    an amorphous underlayer between the heatsink layer and the dual phase seed layer;
    a cap layer on the magnetic recording layer; and
    an overcoat layer on the cap layer.

11. The magnetic recording medium of claim 10, further comprising a thermal barrier layer between the amorphous underlayer and the heatsink layer.

12. A method for manufacturing a magnetic recording medium for heat assisted magnetic recording, the method comprising:
    providing a substrate;
    providing a heatsink layer on the substrate;
    providing a dual phase seed layer on the heatsink layer, wherein the dual phase seed layer comprises MgO and a segregant, wherein a concentration of the MgO is greater than or equal to 95 percent by volume in the dual phase seed layer; and
    providing a magnetic recording layer comprising FePt on the dual phase seed layer.

13. The method of claim 12, wherein a crystal phase of the MgO is different from a crystal phase of the segregant.

14. The method of claim 12:
    wherein the dual phase seed layer comprises MgO grains; and
    wherein the magnetic recording layer comprises FePt grains separated by a segregant, wherein the FePt grains have about a one to one correspondence with the MgO grains.

15. The method of claim 12, wherein the segregant comprises a material selected from the group consisting of C, ZrO2, BN, AN, and combinations thereof.

16. The method of claim 15, wherein the segregant comprises C in a range of about 1 percent to 5 percent by volume.

17. The method of claim 15, wherein the segregant comprises ZrO2 in an amount less than about 5 percent by volume.

18. The method of claim 12, wherein the segregant comprises a material selected from the group consisting of an amorphous material and an amorphous alloy.

19. The method of claim 12, wherein the segregant comprises a characteristic selected from the group consisting of being chemically non-reactive with MgO, being substantially immiscible with MgO, having a lower surface energy than that of MgO, and combinations thereof.

20. The method of claim 12, wherein providing the magnetic recording layer comprises providing a multi-layer magnetic recording layer comprising:
    providing a first magnetic recording layer comprising FePtX, where X is a material selected from the group consisting of Cu, Ni, and combinations thereof;
    providing a second magnetic recording layer on the first magnetic recording layer and having at least one material different from the materials of the first magnetic recording layer; and
    providing a third magnetic recording layer on the second magnetic recording layer and having at least one material different from the materials of the first magnetic recording layer.

21. The method of claim 12, further comprising:
    providing an adhesion layer between the substrate and the heatsink layer;
    providing an amorphous underlayer between the heatsink layer and the dual phase seed layer;
    providing a cap layer on the magnetic recording layer; and
    providing an overcoat layer on the cap layer.

22. The method of claim 21, further comprising providing a thermal barrier layer between the amorphous underlayer and the heatsink layer.

23. The method of claim 12, further comprising:
    selecting a characteristic to form a preselected grain size for grains of the MgO, wherein the characteristic is selected from the group consisting of a material of the segregant, a quantity of the segregant, and combinations thereof.

24. The method of claim 12, further comprising:
    controlling a grain size of grains of the FePt in the magnetic recording layer by selecting a characteristic to form a preselected grain size for grains of the MgO, wherein the characteristic is selected from the group consisting of a material of the segregant, a quantity of the segregant, and combinations thereof.

25. A magnetic recording medium for heat assisted magnetic recording, the medium comprising:
    a substrate;
    a heatsink layer on the substrate;
    a dual phase seed layer on the heatsink layer, wherein the dual phase seed layer comprises MgO and a segregant, wherein a concentration of the MgO is greater than 50 percent by volume in the dual phase seed layer;
    a pre-seed layer comprising MgO, wherein the dual phase seed layer is directly on the pre-seed layer and the pre-seed layer is on the heatsink layer, and wherein the pre-seed layer is devoid of any segregants and comprises a preselected texture; and
    a magnetic recording layer comprising FePt on the dual phase seed layer.

26. The method of claim 12, wherein the pre-seed layer is devoid of any segregants and comprises a preselected texture.

* * * * *